United States Patent [19]

Gorski et al.

[11] Patent Number: 4,879,667

[45] Date of Patent: Nov. 7, 1989

[54] PROCESS FOR GENERATING A COMPUTER MODEL OF AN ALTERABLE STRUCTURE

[75] Inventors: Werner Gorski, Haslach; Josef Huber, Engelsberg, both of Fed. Rep. of Germany

[73] Assignee: Dr. Johannes Heidenhain GmbH, Traunreut, Fed. Rep. of Germany

[21] Appl. No.: 227,464

[22] Filed: Aug. 2, 1988

Related U.S. Application Data

[63] Continuation of Ser. No. 691,666, Jan. 15, 1985, abandoned.

[30] Foreign Application Priority Data

Feb. 3, 1984 [DE] Fed. Rep. of Germany ....... 3403677

[51] Int. Cl.⁴ ................ G06F 15/40; G06G 7/48; G06K 9/00
[52] U.S. Cl. .................................. 364/522; 364/518; 364/474.24; 364/578; 340/729
[58] Field of Search ............ 364/512, 518, 520, 521, 364/522, 523, 578, 141, 147, 192, 474.24, 474.13, 474.15, 474.25, 474.26; 340/729, 747; 382/8

[56] References Cited

U.S. PATENT DOCUMENTS

| | | | |
|---|---|---|---|
| 3,927,948 | 12/1975 | Cox et al. | 356/167 |
| 4,127,849 | 11/1978 | Oker | 364/522 |
| 4,222,048 | 9/1980 | Johnson | 340/747 |
| 4,275,449 | 6/1981 | Aish | 364/512 |
| 4,328,550 | 5/1982 | Weber | 364/192 X |
| 4,490,781 | 12/1984 | Kishi et al. | 364/191 |
| 4,509,043 | 4/1985 | Mossaides | 340/729 |
| 4,521,860 | 6/1985 | Kanematsu et al. | 364/474 |
| 4,530,046 | 7/1985 | Munekata et al. | 364/191 |
| 4,556,833 | 12/1985 | Kishi et al. | 364/474 |
| 4,558,438 | 12/1985 | Jones et al. | 340/728 |
| 4,586,145 | 4/1986 | Bracewell et al. | 364/512 |
| 4,627,003 | 12/1986 | Kishi et al. | 364/520 |
| 4,642,754 | 2/1987 | Kishi et al. | 364/191 |
| 4,646,228 | 2/1987 | Ikeda | 364/192 |
| 4,660,148 | 4/1987 | Kishi et al. | 364/474.24 |
| 4,665,492 | 5/1987 | Masters | 364/474.24 |
| 4,706,002 | 11/1987 | Fukuyama | 364/492 |
| 4,740,902 | 4/1988 | Yoneda et al. | 364/474.25 X |
| 4,791,579 | 12/1988 | Kranitzky | 364/518 |

FOREIGN PATENT DOCUMENTS

| | | |
|---|---|---|
| 0083836 | 11/1982 | European Pat. Off. . |
| 0089562 | 9/1983 | European Pat. Off. . |
| 0121100 | 2/1984 | European Pat. Off. . |
| 0738441 | 3/1979 | Fed. Rep. of Germany . |
| 3234426 | 3/1983 | Fed. Rep. of Germany . |
| 2140937A | 5/1984 | United Kingdom . |

OTHER PUBLICATIONS

Wang, W. "Solid Geometric Modeling for Mold Design and Manufacture" *General Electric Technical Information Series*, report No. 84CRD122, May 1984, pp. 1–30.

"The Polygon Package", by EE Barton and I Buchanan, *Computer Aided Design*, vol. 12, No. 1, Jan. 1980, pp. 3–11.

Computer Verification of Machine Control Data by Lawrence O. Ward, Proceedings: 17th Numerical Control Soc. Annual Meeting and Tech. Conf., Apr. 27–30, 1980, pp. 299–320.

*Primary Examiner*—Parshotam S. Lall
*Assistant Examiner*—Joseph L. Dixon
*Attorney, Agent, or Firm*—Willian Brinks Olds Hofer Gilson & Lione

[57] ABSTRACT

A process for generating a data structure of a computer model of a processed workpiece. The contours of the workpiece and the cross section of the tool, as well as the path movement of the tool, are analyzed in a grid such as is presented by a raster picture screen and associated image point memory of a microprocessor controlled graphic control unit of a numerically controlled machine tool. At each point of the coordinated grids the height of the workpiece is linked with the programmed processing depth of the tool and in this way the altered data structure of the workpiece is determined. The altered data structure can serve for the representation of the computer model thus determined on a picture screen. The linkage of the data from grid point to grid point is thus reduced to a number comparison for the Z coordinate, thereby maintaining both computer and apparatus capital expenses at a low level.

7 Claims, 2 Drawing Sheets

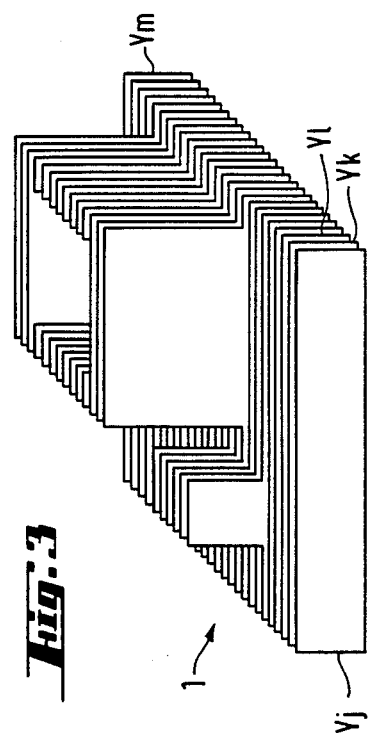
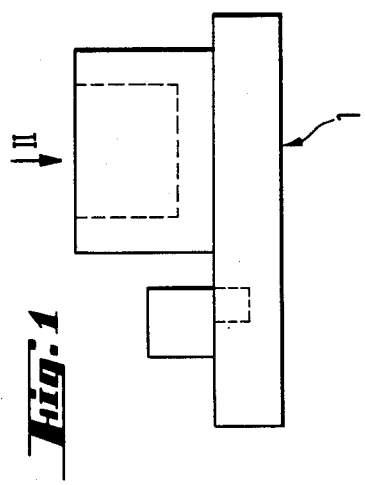
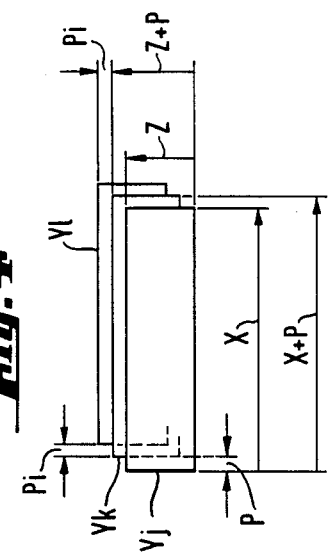
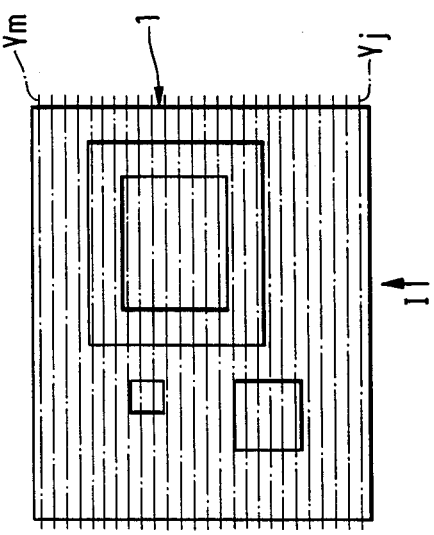

PROCESS FOR GENERATING A COMPUTER MODEL OF AN ALTERABLE STRUCTURE

This application is a continuation of application Ser. No. 691,666 filed Jan. 15, 1985, now abandoned.

BACKGROUND OF THE INVENTION

The present invention relates to a process for generating a data structure for a computer model of a variable structure which can be altered by an object such as a machine tool.

German DE-OS 32 34 426 discloses a system in which a process workpiece is represented on the picture screen of a numerically controlled machine tool in correspondence with the appropriate drawing information. The path of the tool is then superimposed in a predetermined color in the form of a continuous line. This approach does not provide any simulation of the processing of the workpiece from the blank to the finished workpiece.

In the computer-aided design field, it is a known practice to represent a workpiece graphically in such a way that covered edges are not represented. In general, computer-aided design techniques require a high expenditure of apparatus and computation, which is not feasible for use in numerically controlled machine tools, the controls of which are often implemented with microprocessors.

However, even in relatively simple numerically controlled machine tools, there is a need to simulate the processing of the workpiece in order to check programming of the machine tool and if necessary, to correct it, without requiring actual fabrication of an expensive workpiece. Of course, such a simulation of a processing operation should be performed as rapidly as possible.

SUMMARY OF THE INVENTION

The present invention is directed to a process for creating a data structure which can be used for example in graphically representing a computational or computer model of a structure which is to be altered in a processing operation. The process of this invention operates in a particularly simple and rapid manner.

According to this invention, a two-dimensional grid is defined over a two-dimensional contour defined by the structure, and this grid comprises a multiplicity of grid points, each addressable by a unique set of coordinates in a first plane. A respective first signal is assigned to each of the grid points, and each of these first signals is indicative of the thickness of the structure in a third dimension at the coordinates of the associated grid point. Selected ones of the first signals are then altered in response to a simulated processing operation in order to simulate alteration to the structure.

This invention provides important advantages in that it does not require great expenditures in either apparatus or in calculation time to generate the data structure for a computer model, as is required in typical computer-aided design systems. Nevertheless, the process of this invention provides a better representation of the workpiece than in the prior art numerically controlled machine tool systems described above.

The invention itself, together with further objects and attendant advantages, will best be understood by reference to the following detailed description, taken in conjunction with the accompanying drawings.

BRIEF DESCRIPTION OF THE DRAWINGS

FIG. 1 shows a front view of a workpiece that is to be represented on a picture screen.

FIG. 2 is a plan view of the workpiece of FIG. 1 showing the location of sections $Y_j, Y_m$.

FIG. 3 is a perspective representation of the workpiece of FIG. 1 as shown on the picture screen.

FIG. 4 is an enlarged diagram showing three of the sections of FIG. 3.

DETAILED DESCRIPTION OF THE PRESENTLY PREFERRED EMBODIMENTS

Figure 5:
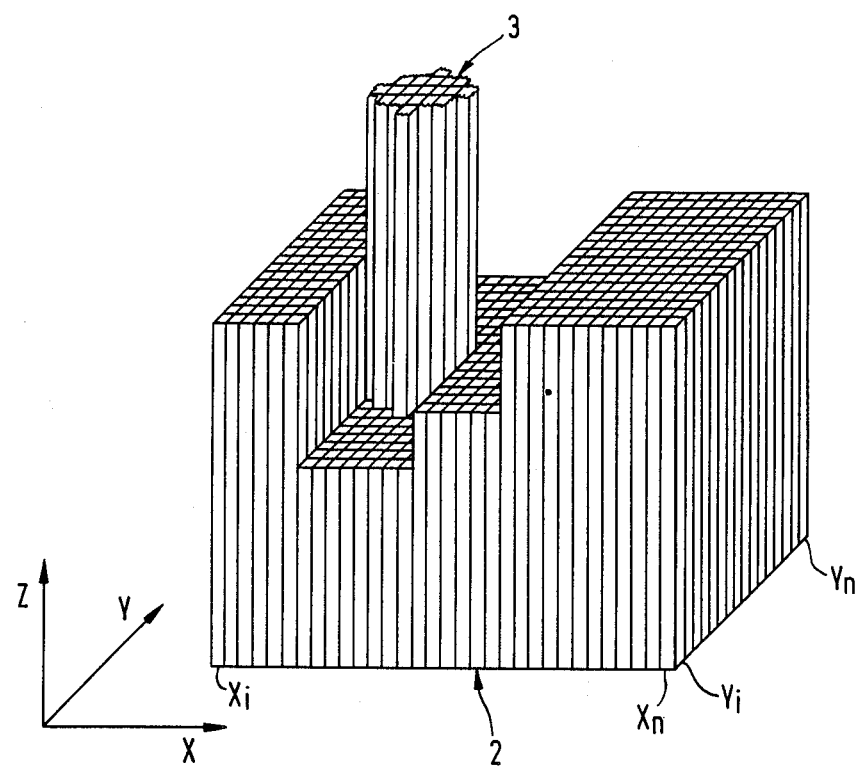
FIG. 5 is a schematic representation showing the data structure of this preferred embodiment for representing both the workpiece and the tool.

Turning now to the drawings and in particular to FIG. 5, an arbitrary object as for an example a square building block has a base surface and a predetermined height. In order to make it possible to represent the block on the picture screen of a numerically controlled machine tool, the dimensions of the block and its position in space are stored. This storage occurs in a so-called picture point memory, in which for each picture point on the raster picture screen of the control there is provided a storage location, so that the picture point memory likewise is organized in a grid. By subdividing the memory into individual grid points, each memory location is addressable by giving its coordinates in the X and Y axes.

Now, if the block is to be stored, the grid of the picture point memory in the form of X-Y coordinates is impressed on the block. Each point of the base surface of the block is stored in a respective one of the storage locations having X addresses ranging between $X_i$ and $X_n$ and Y addresses ranging between $Y_i$ and $Y_n$. The height of the block is determined by the Z coordinate, which is stored in each corresponding location. In the case of the building block used in the example above, the same number indicative of the single predetermined height of the building block is stored in the memory location for each grid point.

As shown by this example, the data structure is addressed by the X and Y coordinates, and to each pair of X and Y coordinates a corresponding number indicative of the height or thickness of the object being represented is stored in the corresponding memory location.

When the contour of the process workpiece is to be altered, the data structure described above must be successively varied for successive processing operations.

For this purpose, the cross-section of the workpiece is subdivided into grid points in exactly the same manner as the base surface of the block in the foregoing example. When a processing tool having a predetermined cross-section is moved along a preprogrammed path, a so-called processing polygon is generated that is similarly subdivided into a plurality of grid points, corresponding to respective grid points of the workpiece.

The tool moves along its path at the process sing depth established by the program of the numerically controlled machine tool. This processing depth corresponds to a certain but variable numerical value in the Z axis. All of these data indicative of the position and movement of the tool are predetermined and must be linked with the data structure for the workpiece in order to generate an altered data structure which is a computer internal model indicative of the altered or processed workpiece.

FIG. 5 shows an example of the manner in which the data structure described above can be implemented. In FIG. 5, the workpiece 2 is subdivided into a grid addressable along the X and Y axes. As shown in FIG. 5, the X index varies between $X_i$ and $X_n$ and the Y index varies between $Y_i$ and $Y_n$. For each X-Y pair a single Z coordinate is stored, which indicates the height or thickness of the workpiece at the corresponding X-Y coordinates. FIG. 5 also shows a processing tool 3 which in this preferred embodiment is a cylindrical milling tool. Of course, due to the finite resolution of the grid, the cylindrical tool 3 appears stepped in contour. Only the lowermost portion of the milling tool 3 is shown, and the upper surface of the milling tool 3 is shown in breakaway.

The linkage between the data structures for the processing tool 3 and the workpiece 2 occurs in a very simple manner: at each grid point in the X-Y plane the numerical value for the Z coordinate of the workpiece 2 is compared with the numerical value for the Z coordinate of the cutting edge of the tool 3 if one of the grid points that is included in the processing polygon passes into the zone of the grid that is occupied by the X-Y coordinates of the workpiece 2. Of course, the processing depth of the tool 3 must be referred to the plane in which the base surface of the workpiece 2 is arranged. In actual practice, this appears as if at each grid point of the workpiece 2 the height of the workpiece 2 is compared with the distance of the associated grid point of the tool 3 from the X-Y plane. If the distance of the grid point of the tool 3 from the X-Y plane is less than the height of the grid point of the workpiece 2 at the corresponding X-Y address, then the tool 3 will remove material in processing the workpiece 2 and a new contour will be generated. This is reflected in an altered data structure in which the Z coordinate of the data structure for the workpiece 2 at the X-Y address is changed. On the other hand, if the above-described comparison indicates that the height of the workpiece 2 at this grid point is less than the distance of the tool 3 from the X-Y plane at this point, then the tool 3 will not come into engagement with the workpiece 2 and the contour of the workpiece 2 will not be altered. This can occur if previous processing operations have already occurred reducing the thickness of the workpiece 2.

Through the foregoing example of the process of this invention, data for the workpiece 2 is linked with data for the tool 3 by resolving both the workpiece 2 and the tool 3 into a common grid in parallel planes. The third dimension is determined through a computational number comparison at each grid point. In this way, the resulting data structure for the altered workpiece is generated in a considerably simplified manner. The process of this invention makes it possible to simulate workpiece 2 processing on a relatively simple numerically controlled machine tool. This simulation can be used to generate graphic representations, for example on a picture screen of a microprocessor controlled machine tool.

The following discussion of FIGS. 1–4 relates to a particularly advantageous process for representing the data structure of an altered object, which data structure is determined in the manner described above.

FIG. 1 shows a workpiece 1 as typically represented in technical drawings. Visible edges are drawn in solid, continuous lines according to standard technical drawing conventions. Edges that are not visible in this front view are drawn in thinner, broken lines, as is also determined by drawing conventions. The workpiece 1 of FIG. 1 represents an object that is to be produced on a numerically controlled machine tool. In order for it to be possible to manufacture this workpiece 1 from a blank, a program for a numerically controlled machine tool is set up in a known manner. The program generated from the technical drawing of the finished workpiece 1 is then fed in the form of program data and commands to the numerically controlled machine tool.

In order to locate programming errors without producing a rejected workpiece, the workpiece 1 as it would be generated from the program and the blank is represented on the picture screen of the numerical control of the machine tool. This is accomplished most impressively by showing a perspective representation in which concealed edges have been suppressed.

This representation can be made in a particularly simple and advantageous manner by resolving the workpiece 1 into a series of sections that are displaced from one another in order to provide a perspective view.

FIG. 2 is a plan view which shows the orientation of parallel sections $Y_j$-$Y_m$. Each of these sections $Y_j$-$Y_m$ corresponds to a respective section plane, the surface of which corresponds to the cross-section shape of the workpiece 1 at the respective section plane. The contour of each of these surfaces is a polygon, the coordinates of which are stored in a memory of the numerically controlled machine in the form of data.

FIG. 3 shows a finished representation of the workpiece 1 as it would appear in perspective representation on the picture screen of the numerical control.

This image has been constructed successively. First data of the first polygon, which corresponds to the first section plane $Y_j$, is taken from the memory and applied as an input a graphic processor which causes the $Y_j$ polygon to be displayed on the picture screen. The coordinate $Y_j$ of this first polygon indicates that this first polygon is present in the $Y_j$ plane. The further stored data indicate the extent of the polygon in the X direction (width) as well as the extent of the polygon in the Z direction (height). The height can range from the maximum height of the workpiece blank to the height "zero" if all of the material on the blank has been removed in a particular place.

The representation of the polygon of the next section plane occurs at the next coordinate $Y_k$. In order to impart a spatial impression to the image of the object, the polygon at the section plane $Y_k$ is represented displaced in perspective with respect to the previously represented polygons.

In this embodiment, concealed edges are not to be displayed, and for this reason the polygon of the new section $Y_k$ is checked to determine whether any part of the contour of the new polygon $Y_k$ overhangs the contour of the polygon $Y_j$, taking into account the perspective displacement. Only if the contour of the polygon being represented overhangs the contours of previously represented polygons is this contour to be represented. In this way, it is assured that edges of a polygon which are represented successively are displayed only if they overhang at least one of the section planes already represented.

A determination as to whether the contour of an already depicted section plane is overhung can easily be checked in the computer, since one merely has to compare the coordinate values of the respective polygons, taking into account the actual perspective displacements.

The simple example of FIG. 4 has been provided to clarify this last point. In FIG. 4 the polygon $Y_j$ of the first section plane is shown having a width X in the X direction and a height Z in the Z direction. In order to cause the object to appear to have a spatial extent, the polygon $Y_k$ of the second section plane is displaced by two picture points in correspondence to the raster picture screen in both the X and Z directions.

In this example, the object being displayed has the same width X and height Z in the second section plane $Y_k$ as in the first section plane $Y_j$. According to this invention, the second section plane $Y_k$ is represented in such a way that the perspective displacement P is taken into account in calculating which portions of the polygon $Y_k$ are to be represented. In this example, the upper edge of the second polygon $Y_k$ presents the coordinates Z+P, which is greater than the height Z of the first polygon $Y_j$ and is therefore represented. Similarly, the right edge of the second polygon $Y_k$ has the coordinate X+P which is greater than X and is therefore represented. The left edge of the polygon $Y_k$ is represented insofar as its height Z+P is greater than the height Z of the polygon $Y_j$ of the first polygon. Thus, only the uppermost portion P of the left edge of the polygon $Y_k$ is represented. The situation is exactly the same with respect to the representation of the lower edge of the polygon $Y_k$.

This simple determination of the edges of the individual polygons which are to be represented makes the process of the invention executable in a particularly rapid and straight-forward manner such that it can be carried out on relatively simple microprocessor-based systems.

Of course, it should be understood that a wide range of changes and modifications can be made to the preferred embodiments described above. It is therefore intended that the foregoing detailed description be regarded as illustrative rather than limiting, and that it is the following claims, including all equivalents, which are intended to define the scope of this invention.

We claim:

1. A process for generating a data structure for a computer model of a structure which is alterable by an object having a defined path, said process comprising the following steps:
   (a) defining a two dimensional grid over a two dimensional contour defined by the structure, said grid comprising a multiplicity of grid points, each addressable by a unique set of coordinates in a first plane;
   (b) assigning a respective first signal to each of the grid points, each first signal indicative of the thickness of the structure in a third dimension at the coordinates of the respective grid point; and
   (c) altering selected ones of the first signals in response to the object and the path of the object in order to simulate alteration to the structure.

2. The process of claim 1 wherein the object defines a polygon in a plane parallel to the first plane as the object moves in the defined path, and wherein the altering step comprises the following steps:
   (d) defining a respective second signal at each of the grid points in the polygon indicative of the position of the object in the third dimension at the coordinates of the respective grid point; and
   (e) comparing each of the second signals with the first signal at each respective grid point.

3. The process of claim 1 further comprising the following steps:
   (d) storing the altered first signals; and
   (e) displaying on a display unit a multidimensional image of the altered structure based on the stored first signals.

4. The process of claim 3 wherein the multidimensional image comprises a plurality of two dimensional views.

5. The process of claim 3 wherein the multidimensional image comprises a spatial image formed through parallel projection.

6. The process of claim 5 wherein the displaying step comprises the following steps:
   (a) generating a plurality of spaced parallel section surfaces, each indicative of the cross sectional shape of the altered structure in a respective plane; and
   (b) displaying selected parts of the section surfaces on the display unit with adjacent surfaces offset from one another by a perspective displacement;
   (c) said selected parts including those parts of the section surfaces which overhang a previously represented section surface, taking into account the perspective displacement.

7. The process of claim 6 wherein selected parts of the section surfaces are determined by a simple comparison of coordinates of a selected section surface with coordinates of previously represented section surfaces, said coordinates of the selected section surface indicative of the dimensions of the structure, the position of the selected section surface with respect to the plurality of section surfaces, and the perspective displacement.

* * * * *